United States Patent
Hallensleben

(10) Patent No.: US 9,118,684 B2
(45) Date of Patent: Aug. 25, 2015

(54) METHOD FOR REQUESTING USER ACCESS TO AN APPLICATION

(75) Inventor: Sebastian Hallensleben, Burgess Hill (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1050 days.

(21) Appl. No.: 10/527,253

(22) PCT Filed: Sep. 21, 2002

(86) PCT No.: PCT/EP02/10634
§ 371 (c)(1),
(2), (4) Date: Mar. 9, 2005

(87) PCT Pub. No.: WO2004/028106
PCT Pub. Date: Apr. 1, 2004

(65) Prior Publication Data
US 2006/0015738 A1    Jan. 19, 2006

(51) Int. Cl.
*H04L 9/00* (2006.01)
*H04L 29/06* (2006.01)

(52) U.S. Cl.
CPC .......... *H04L 63/102* (2013.01); *H04L 63/0815* (2013.01); *H04L 63/08* (2013.01)

(58) Field of Classification Search
CPC .... H04L 63/08; H04L 63/0815; H04L 63/102
USPC .......................................... 726/2, 8
See application file for complete search history.

(56) References Cited

U.S. PATENT DOCUMENTS

| | | | |
|---|---|---|---|
| 5,655,077 A * | 8/1997 | Jones et al. ................ | 726/8 |
| 6,163,843 A * | 12/2000 | Inoue et al. ................ | 726/11 |
| 6,275,941 B1 * | 8/2001 | Saito et al. ................ | 726/2 |
| 6,704,789 B1 * | 3/2004 | Ala-Laurila et al. .......... | 709/230 |
| 6,826,692 B1 * | 11/2004 | White ................ | 726/8 |
| 7,185,359 B2 * | 2/2007 | Schmidt et al. ................ | 726/2 |
| 7,185,360 B1 * | 2/2007 | Anton et al. ................ | 726/3 |
| 7,218,634 B1 * | 5/2007 | Khalil et al. ................ | 370/392 |
| 2002/0035699 A1 * | 3/2002 | Crosbie ................ | 713/201 |
| 2002/0060994 A1 * | 5/2002 | Kovacs et al. ................ | 370/328 |
| 2003/0105962 A1 * | 6/2003 | Le et al. ................ | 713/170 |
| 2003/0120948 A1 * | 6/2003 | Schmidt et al. ................ | 713/200 |
| 2003/0163733 A1 * | 8/2003 | Barriga-Caceres et al. .. | 713/201 |

FOREIGN PATENT DOCUMENTS

| | | |
|---|---|---|
| WO | WO 0056112 A | 9/2000 |
| WO | WO 0219749 A | 3/2002 |

OTHER PUBLICATIONS

C. Perkins. "RFC2002: IP Mobility Support" Published Oct. 1996 (79 pages http://www.faqs.org/ftp/rfc/pdf/rfc2002.txt.pdf.*

(Continued)

*Primary Examiner* — Joseph P Hirl
*Assistant Examiner* — Thomas Gyorfi

(57) ABSTRACT

The invention relates to a method for requesting users access to an application by a network. The application is provided by an entity that is not part of the network. The invention allows a unified access to the application independent from the network used to access it. Therefore a network receiving an access request for the application from a user determines through which network the user attempted to access the application the first time. It then requires the identifier used by the network of first access and uses the same identifier towards an entity providing said application.

16 Claims, 3 Drawing Sheets

(56) References Cited

OTHER PUBLICATIONS

Wikipedia entry for "HTTP cookie", originally published Jun. 16, 2002. http://en.wikipedia.org/w/index.php?title=HTTP_cookie&oldid=451918.*

J. Allaire. "Macromedia Flash MX-A next-generation rich client" Published Mar. 2002 (14 pages). http://download.macromedia.com/pub/flash/whitepapers/richclient.pdf.*

R. Droms. "RFC 2131: Dynamic Host Configuration Protocol" Published Mar. 1997 (45 pages). http://www.rfc-editor.org/rfc/pdfrfc/rfc2131.txt.pdf.*

S. Thomson et al. "RFC 2462: IPv6 Stateless Address Autoconfiguration" Published Dec. 1998 (25 pages) http://www.rfc-editor.org/rfc/pdfrfc/rfc2462.txt.pdf.*

R. Droms et al. RFC 3315: Dynamic Host Configuration Protocol for IPv6 (DHCPv6) © 2003 The Internet Society (101 pages) http://tools.ietf.org/pdf/rfc3315.pdf.*

* cited by examiner

METHOD FOR REQUESTING USER ACCESS TO AN APPLICATION

TECHNICAL FIELD

The present invention relates to a method and means for requesting access for a user to an application.

RELATED ART

Operators of telecommunications networks and computing networks face an increasing demand from the customers for applications provided by so-called third parties. Third parties do neither belong to the network operator nor to the customer. Applications provided by said third parties are called external applications to distinguish between applications provided by the operator and applications provided by the third party. Applications often require information from a user to provide the application in a more tailored fashion. To avoid repeated inputs of these customer settings, they are stored in a user profile.

The U.S. Pat. No. 6,275,941 describes a method for accessing an external application through a communications network.

However, growing demand for mobility in combination with the desire to receive the same service independent from the network used for access lead to a request for a method and means that support the access to an external application wherein the same user profile is used by the application independent from the chosen network.

It is an object of the invention to provide such method and means for executing the method.

SUMMARY

The invention relates to a method for requesting access for a user to an application. Said application is provided by an entity that can be accessed at least through a first network and a second network. The user attempted to access the application at least once through the first network. The method comprises the following steps, granting the user access to the second network, receiving a request for accessing the application from the user, detecting that the user already contacted the application via the first network, requesting from the first network an identifier that has been used by the first network to identify the user towards the entity that provides the application, receiving the requested identifier, and sending a request for accessing the application and the identifier received from the first network towards the entity providing the application.

In the invented method the identifier is requested from the network through which the first attempt to access the application has been executed. This has the advantage that the identifier has not to be stored in the user equipment and enables to use different identifiers between network and user and network and entity providing the application. This can establish anonymity between the user and the entity.

A user can be anyone who is authorised to access the first network and the second network. For example a subscriber of the first network if the operator of the first network and of the second network have a service agreement permitting access to the second network for subscribers of the first network.

A network can be for example a wireline or wireless network for telecommunications or computing. An application can be for example a service or a game. An entity providing an application can be e.g. a further network, a server, or a computing device.

In an embodiment of the invented method, authentication information is sent to the first network. This authentication information is sent for example if authentication is necessary to receive the identifier of the user from the first network. This enables to avoid fraudulent requests for the identifier.

The first and the second network can be run by a different operator.

In an embodiment of the invented method, the entity providing the service stores a profile of the user at reception of the first attempt of the user to access the service. Said profile is associated to the identification sent from the first network. In order to achieve that the stored profile is used for the user, the second network uses the same identification to identify the user towards the entity providing the service as the first network. The user profile can comprise e.g. information about user preferences, access data, former uses of the application. This is advantageous as it allows a unified appearance of the application towards the user and increases user friendliness, as settings have to be done only once, both independent from the network used to access the application.

According to the invention, a node for requesting access for a user to an application comprises an input/output unit, a processing unit, and a determining unit for determining that a user already contacted an entity providing an application through a further network.

In an embodiment of the invented node, the node further comprises a logical unit for requesting an identification used by the further network to identify the user towards the entity providing the application.

It is advantageous that the determining unit and the logical unit are integrated in the same node, because signalling capacity within a node is simpler and less costly to establish than between nodes.

BRIEF DESCRIPTION OF THE DRAWINGS

The following figures show.

DETAILED DESCRIPTION

In the following the invention will be further described by means of examples and by means of figures.

Figure 1:
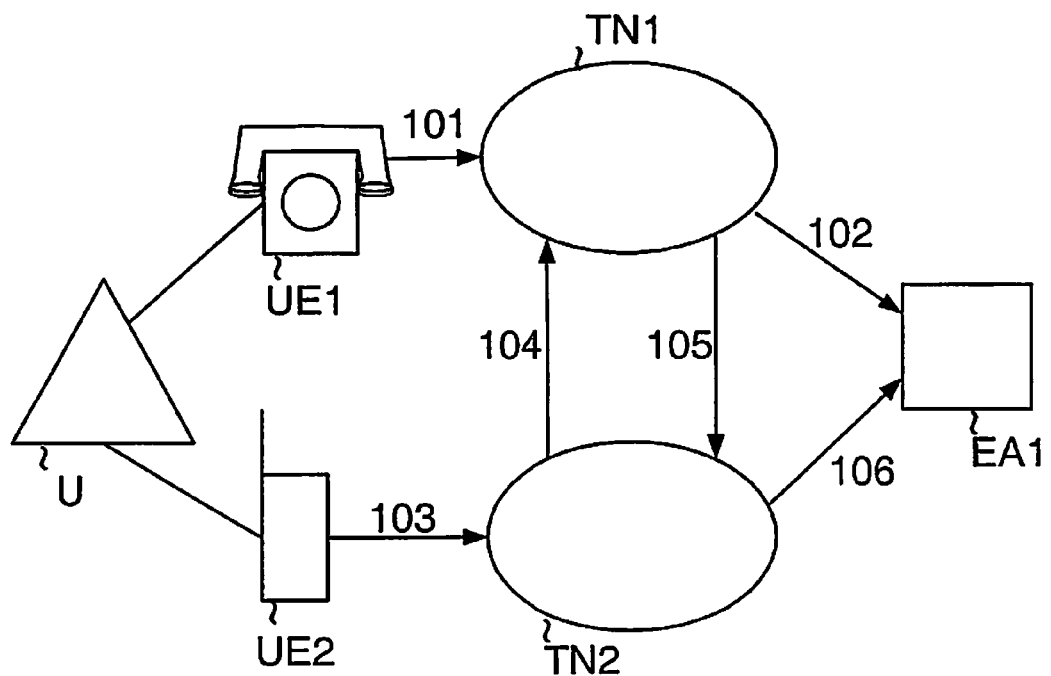
FIG. 1 depicts a request for an external application according to the invention.

FIG. 1 depicts a user U, requesting access to an external service provided by an entity EA1. The first access request is sent via a user equipment UE1 and a first network TN1 that is connected to the user equipment UE1 and the entity providing the application EA1. In a first step the user equipment UE1 sends the request for accessing the application to the first network TN1. The first network generates an identifier for the user U that is used towards the entity EA1 providing the application. The first network TN1 stores the identifier, sends an access request for the user U and the identifier to the entity EA1 providing the application in a step 102.

In a preferred embodiment of the invention, the entity providing the application EA1 stores a user profile of the user U associated to the identifier sent by the first network TN1.

It is not depicted whether or not the requested access to the application is granted. Furthermore not depicted is whether or not the first access via the first network is terminated before a second access is requested.

In a next step 103, the user U requests access to the application by sending an access request from a second user equipment UE2 to a second network TN2.

The second network TN2 determines that the user already requested access to the application. The determination can be performed for example by determining that the user identification used towards the second network indicates that the user has subscribed to another network or that the user has been ported to another network. The porting of subscribers can be determined by means of a number portability database. The network then requests information from the network the user subscribed to, the home network of the user, whether the user already attempted to access the application. In another embodiment of the invention the user sends an indication that he already attempted to access the application via another network together with the request for access to the application. In yet another embodiment a database stores information about users, the applications they at least attempted to access and the network of first attempt. In a further step 104 the second network requests the identification the first network TN1 used towards the entity EA1 providing the application. The first network returns said identification in a next step 105.

In an embodiment of the invention, the method comprises the additional step of sending authentication information to the first network. The authentication information can be sent together with the request for the identifier.

Afterwards the second network TN2 requests access for the user U from the entity providing the application EA1 in a next step 106, using the identification received from the first network.

Figure 2:
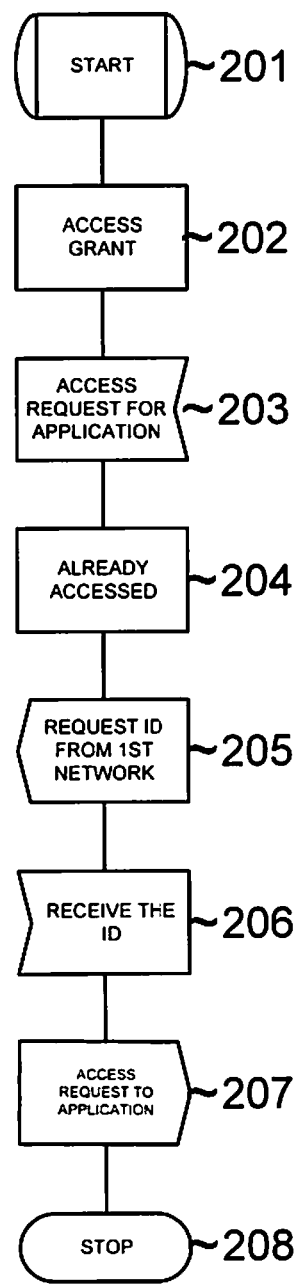
FIG. 2 depicts a flow diagram for the invented method.

FIG. 2 depicts a flowchart of the invented method. The method is executed by a second network to request access to an application provided by an entity that can be accessed at least via a first and the second network. At the first step 201 the second network is in a state that it is prepared to execute the method. In a next step 202 it grants a user access to the second network. In the following step 203 it receives a request for accessing an external application from the user. The network detects that the user already contacted the requested application through the first network in step 204. The second network requests the identification used by the first network towards the entity providing the service from the first network in the succeeding step 205. It receives the requested identifier from the first network in a step 206. Afterwards it sends an access request to the entity providing the application in a step 207, using the identifier received from the first network. Doing so, the invented method is finished 208.

Figure 3:
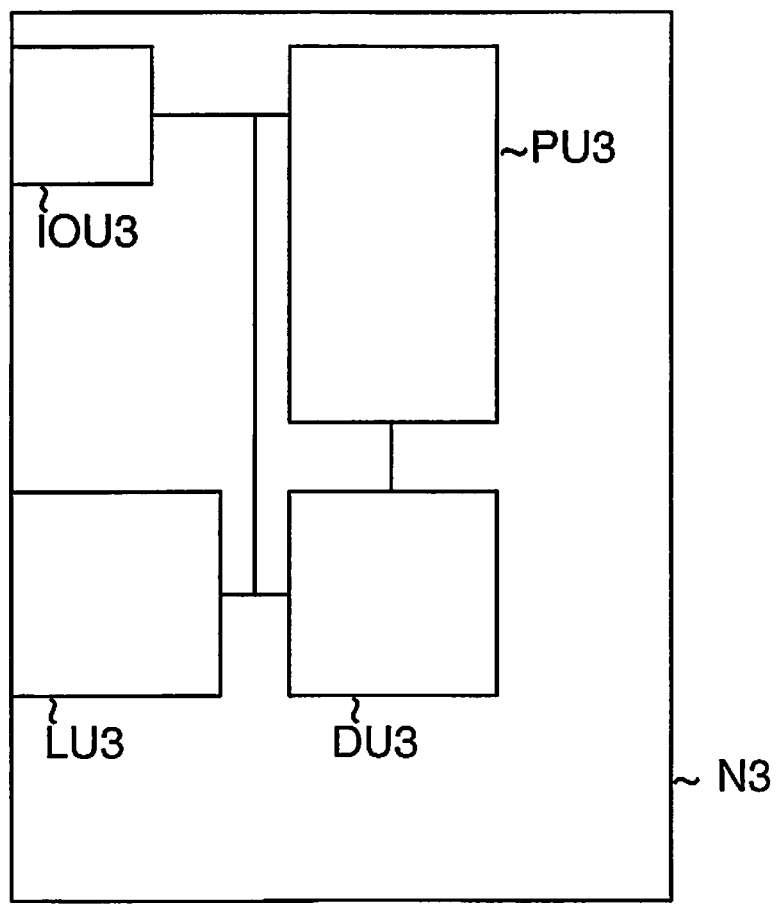
FIG. 3 depicts a schematic of a node as invented.

A node N3 for requesting access according to the invention is depicted in FIG. 3. The node comprises an input/output unit IOU3 for sending and receiving messages and a processing unit PU3 for controlling the node and coordinating the units of the node. The node further comprises a determining unit DU3 for determining that a user requesting access to an application already contacted an entity providing the application. Said unit can perform that for example by determining that the user is identified towards the network comprising the node by an identifier indicating that the user subscribed to another network, a so-called home network of the user, and contact said network. The determining unit DU3 can perform this also for example by analysing the request for access and as a result of the analysis realise that an indication that the user already contacted the application through another network. In a preferred embodiment, said analysis further delivers an identification of the other network.

In an embodiment of the invention, the node N3 further comprises a logical unit LU3 for contacting a first network for requesting an identification used by the first network to identify the user towards the entity providing the application.

The invention claimed is:

1. A method for requesting access for a user to an application in a further network, wherein an entity providing said application can be accessed only through a first network or a second network, the application being independent of the first and second network, and wherein the user attempted to access the application at least once through a first user equipment connected to the first network, the method comprising the following steps:
   granting the user access to the second network via a second user equipment,
   receiving a request for accessing the application from the user,
   detecting by the second network that the user already contacted the application via the first user equipment connected to the first network,
   requesting by the second network from the first network an identifier that was previously generated by and previously used by the first network to identify the user towards the entity that provides the application,
   receiving the requested, generated identifier by the second network, and sending a request, by the second network, for accessing the application and the generated identifier received from the first network, towards the entity providing the application to identify the user to the entity that provides the application, the identifier being used by the first network is the same identifier used by the second network.

2. The method according to claim 1, wherein the first and the second network are run by a different operator.

3. The method according to claim 1 further comprising the step of sending authentication information to the first network.

4. The method according to claim 1, wherein the entity providing the service stores a profile of the user at reception of the first attempt of the user to access the service, wherein the profile is associated to the generated identifier sent from the first network and wherein the second network uses the same generated identifier for the user towards the entity providing the service in order to achieve that the stored profile is used for the user.

5. The method according to claim 1, further comprising the step of storing the generated identifier in the first network.

6. The method according to claim 1, wherein the requested, generated identifier is not stored in or used by the first user equipment or the second user equipment associated with the user.

7. A system for granting user access to an application in a further network, wherein an entity providing said application can be accessed only through a first network or a second network, said application being independent of the first and second networks, and wherein the user attempted to access the application at least once through a first user equipment connected to the first network, comprising:
   means for granting said user access to the second network via a second user equipment,
   means for receiving a request for accessing the application from the user within said second network,
   means for detecting, by the second network, that the user already attempted to access the application via the first user equipment connected to the first network,
   means for requesting from the first network, by the second network, an identifier that was previously generated by and previously used by the first network to identify the user towards the entity that provides the application,
   means for receiving the requested, generated identifier, from the first network, by the second network, and means for sending a request, by the second network, for accessing the application towards the entity providing the application, said request including the generated identifier received from the first network to identify the user to the entity that provides the application, the identifier being used by the first network is the same identifier used by the second network.

8. The system according to claim 7, wherein the first and the second network are run by different operators.

9. The system according to claim 7 further comprising means for sending authentication information to the first network.

10. The system according to claim 7, wherein the entity providing the service stores a profile of the user at reception of the first attempt of the user to access the service, wherein the profile is associated to the generated identifier sent from the first network and wherein the second network uses the same generated identifier for the user towards the entity providing the service in order to achieve that the stored profile is used for the user.

11. A system for handling a user request towards an external application wherein a network node providing said application is only accessible from a first communication network or a second communication network, the external application being independent of the first and second communication networks, said second communication network comprising:
   means for receiving an access request from said user via a second user equipment connected to said second communication network wherein said access request is for accessing said application associated with said network node;
   means for determining that the user had previously attempted to access said application using a first user equipment connected to said first communication network;
   means for requesting user information associated with said user from said first communication network, said user information including an identifier that was previously generated by and previously used by the first communication network to identify the user towards the network node that provides the application;
   means for receiving said requested user information, including the generated identifier from said first communication network; and
   means for requesting access to said network node from said second communication network using said received user information, including the generated identifier, to identify the user to the network node that provides the application, the identifier being used by the first network is the same identifier used by the second network.

12. The system of claim 11 wherein said user information including said generated identifier is used by said first communication network in communicating with said network node.

13. The system of claim 11 wherein said user information includes user preference information used by said first communication network in communicating with said network node.

14. The system of claim 11 further comprising means for sending authentication information from the second communication network to the first communication network.

15. The system of claim 11 wherein said means for determining that the user had previously attempted to access said application using said first communication network further comprises means for receiving an indicator from said user.

16. The system of claim 11 wherein said means for determining that the user had previously attempted to access said application using said first communication network further comprises means for determining that the user had been ported from said first communication network to said second communication network.

\* \* \* \* \*